(12) United States Patent
Payne

(10) Patent No.: US 8,663,828 B2
(45) Date of Patent: Mar. 4, 2014

(54) BATTERY SYSTEMS, BATTERY MODULE, AND METHOD FOR COOLING THE BATTERY MODULE

(75) Inventor: Josh Payne, Royal Oak, MI (US)

(73) Assignee: LG Chem, Ltd., Seoul (KR)

( * ) Notice: Subject to any disclaimer, the term of this patent is extended or adjusted under 35 U.S.C. 154(b) by 701 days.

(21) Appl. No.: 12/433,485

(22) Filed: Apr. 30, 2009

(65) Prior Publication Data

US 2010/0279153 A1   Nov. 4, 2010

(51) Int. Cl.
*H01M 10/50* (2006.01)

(52) U.S. Cl.
USPC .......................................... 429/120

(58) Field of Classification Search
USPC .......................................... 429/120
See application file for complete search history.

(56) References Cited

U.S. PATENT DOCUMENTS

| | | | |
|---|---|---|---|
| 2,273,244 A | | 2/1942 | Ambruster |
| 3,503,558 A | | 3/1970 | Galiulo et al. |
| 3,522,100 A | | 7/1970 | Lindstrom |
| 3,579,163 A | * | 5/1971 | Cronin ............................ 336/94 |
| 3,866,704 A | | 2/1975 | Bowers et al. |
| 4,390,841 A | | 6/1983 | Martin et al. |
| 4,396,689 A | | 8/1983 | Grimes et al. |
| 4,936,409 A | | 6/1990 | Nix et al. |
| 5,071,652 A | | 12/1991 | Jones et al. |
| 5,270,131 A | | 12/1993 | Diethelm et al. |
| 5,346,786 A | | 9/1994 | Hodgetts |
| 5,354,630 A | | 10/1994 | Earl et al. |
| 5,364,711 A | | 11/1994 | Yamada et al. |
| 5,378,555 A | | 1/1995 | Waters et al. |
| 5,385,793 A | | 1/1995 | Tiedemann et al. |
| 5,487,955 A | | 1/1996 | Korall et al. |
| 5,487,958 A | | 1/1996 | Tura |
| 5,510,203 A | | 4/1996 | Hamada et al. |
| 5,520,976 A | | 5/1996 | Giannetti et al. |
| 5,558,949 A | | 9/1996 | Iwatsuki et al. |
| 5,561,005 A | | 10/1996 | Omaru et al. |
| 5,578,393 A | * | 11/1996 | Haskins ........................ 429/120 |

(Continued)

FOREIGN PATENT DOCUMENTS

| | | |
|---|---|---|
| CN | 1512518 A | 7/2004 |
| EP | 0736226 B1 | 3/1999 |

(Continued)

OTHER PUBLICATIONS

Chinese Office Action dated Dec. 7, 2007 for Chinese Patent Application No. 200480025941.5 (PCT/KR2004/002399).

(Continued)

*Primary Examiner* — Ula C Ruddock
*Assistant Examiner* — Scott J Chmielecki
(74) *Attorney, Agent, or Firm* — Buckert Patent & Trademark Law Firm, P.C.; John F. Buckert

(57) ABSTRACT

Battery systems, a battery module, and a method for cooling the battery module are provided. The battery module includes a housing having a non-conductive oil disposed therein. The battery module further includes a battery cell disposed in the housing. The battery module further includes a cooling manifold disposed in the housing that contacts the non-conductive oil. The cooling manifold is configured to receive a fluid therethrough and to conduct heat energy from the non-conductive oil into the fluid to cool the battery cell.

17 Claims, 7 Drawing Sheets

(56) References Cited

U.S. PATENT DOCUMENTS

| | | | |
|---|---|---|---|
| 5,582,929 A | 12/1996 | Dechovich | |
| 5,589,290 A | 12/1996 | Klink et al. | |
| 5,606,242 A | 2/1997 | Hull et al. | |
| 5,652,502 A | 7/1997 | van Phuoc et al. | |
| 5,658,682 A | 8/1997 | Usuda et al. | |
| 5,663,007 A | 9/1997 | Ikoma et al. | |
| 5,693,432 A | 12/1997 | Matsumoto | |
| 5,756,227 A | 5/1998 | Suzuki et al. | |
| 5,796,239 A | 8/1998 | Van Phuoc et al. | |
| 5,825,155 A | 10/1998 | Ito et al. | |
| 5,982,403 A | 11/1999 | Inagaki | |
| 6,016,047 A | 1/2000 | Notten et al. | |
| 6,099,986 A | 8/2000 | Gauthier et al. | |
| 6,106,972 A | 8/2000 | Kokubo et al. | |
| 6,117,584 A | 9/2000 | Hoffman et al. | |
| 6,121,752 A | 9/2000 | Kitahara et al. | |
| 6,176,095 B1 * | 1/2001 | Porter | 62/126 |
| 6,230,834 B1 | 5/2001 | Van Hout et al. | |
| 6,257,328 B1 | 7/2001 | Fujiwara et al. | |
| 6,353,815 B1 | 3/2002 | Vilim et al. | |
| 6,362,598 B2 | 3/2002 | Laig-Horstebrock et al. | |
| 6,406,812 B1 | 6/2002 | Dreulle et al. | |
| 6,413,678 B1 | 7/2002 | Hamamoto et al. | |
| 6,422,027 B1 | 7/2002 | Coates, Jr. et al. | |
| 6,441,586 B1 | 8/2002 | Tate, Jr. et al. | |
| 6,448,741 B1 | 9/2002 | Inui et al. | |
| 6,462,949 B1 | 10/2002 | Parish, IV et al. | |
| 6,475,659 B1 | 11/2002 | Heimer | |
| 6,515,454 B2 | 2/2003 | Schoch | |
| 6,534,954 B1 | 3/2003 | Plett | |
| 6,563,318 B2 | 5/2003 | Kawakami et al. | |
| 6,648,090 B2 | 11/2003 | Iwase | |
| 6,709,783 B2 | 3/2004 | Ogata et al. | |
| 6,724,172 B2 | 4/2004 | Koo | |
| 6,771,502 B2 | 8/2004 | Getz, Jr. et al. | |
| 6,780,538 B2 | 8/2004 | Hamada et al. | |
| 6,821,671 B2 | 11/2004 | Hinton et al. | |
| 6,829,562 B2 | 12/2004 | Sarfert | |
| 6,832,171 B2 | 12/2004 | Barsoukov et al. | |
| 6,876,175 B2 | 4/2005 | Schoch | |
| 6,886,249 B2 | 5/2005 | Smalc | |
| 6,892,148 B2 | 5/2005 | Barsoukov et al. | |
| 6,927,554 B2 | 8/2005 | Tate, Jr. et al. | |
| 6,943,528 B2 | 9/2005 | Scoch | |
| 6,967,466 B2 | 11/2005 | Koch | |
| 6,982,131 B1 | 1/2006 | Hamada et al. | |
| 7,012,434 B2 | 3/2006 | Koch | |
| 7,026,073 B2 | 4/2006 | Ueda et al. | |
| 7,039,534 B1 | 5/2006 | Ryno et al. | |
| 7,061,246 B2 | 6/2006 | Dougherty et al. | |
| 7,072,871 B1 | 7/2006 | Tinnemeyer | |
| 7,074,517 B2 | 7/2006 | Higashino | |
| 7,098,665 B2 | 8/2006 | Laig-Hoerstebrock | |
| 7,109,685 B2 | 9/2006 | Tate, Jr. et al. | |
| 7,126,312 B2 | 10/2006 | Moore | |
| 7,197,487 B2 | 3/2007 | Hansen et al. | |
| 7,199,557 B2 | 4/2007 | Anbuky et al. | |
| 7,229,327 B2 | 6/2007 | Zhao et al. | |
| 7,250,741 B2 | 7/2007 | Koo et al. | |
| 7,251,889 B2 | 8/2007 | Kroliczek et al. | |
| 7,253,587 B2 | 8/2007 | Meissner | |
| 7,264,902 B2 | 9/2007 | Horie et al. | |
| 7,315,789 B2 | 1/2008 | Plett | |
| 7,321,220 B2 | 1/2008 | Plett | |
| 7,327,147 B2 | 2/2008 | Koch | |
| 7,400,115 B2 | 7/2008 | Plett | |
| 7,446,504 B2 | 11/2008 | Plett | |
| 7,479,758 B2 | 1/2009 | Moon | |
| 7,518,339 B2 | 4/2009 | Schoch | |
| 7,521,895 B2 | 4/2009 | Plett | |
| 7,525,285 B2 | 4/2009 | Plett | |
| 7,540,102 B2 | 6/2009 | Olmr et al. | |
| 7,583,059 B2 | 9/2009 | Cho | |
| 7,589,532 B2 | 9/2009 | Plett | |
| 7,656,122 B2 | 2/2010 | Plett | |
| 7,723,957 B2 | 5/2010 | Plett | |
| 7,794,868 B2 | 9/2010 | Yang | |
| 7,883,793 B2 | 2/2011 | Niedzwiecki et al. | |
| 7,981,538 B2 | 7/2011 | Kim et al. | |
| 2001/0035739 A1 | 11/2001 | Laig-Horstebrock et al. | |
| 2001/0046624 A1 | 11/2001 | Goto et al. | |
| 2002/0130637 A1 | 9/2002 | Schoch | |
| 2002/0169581 A1 | 11/2002 | Sarfert | |
| 2003/0052690 A1 | 3/2003 | Schoch | |
| 2003/0082440 A1 | 5/2003 | Mrotek et al. | |
| 2003/0184307 A1 | 10/2003 | Kozlowski et al. | |
| 2003/0232239 A1 | 12/2003 | Gow et al. | |
| 2004/0000892 A1 | 1/2004 | Jae-Seung | |
| 2004/0021442 A1 | 2/2004 | Higashino | |
| 2004/0032264 A1 | 2/2004 | Schoch | |
| 2004/0189257 A1 | 9/2004 | Dougherty et al. | |
| 2005/0001627 A1 | 1/2005 | Anbuky et al. | |
| 2005/0026014 A1 | 2/2005 | Fogaing et al. | |
| 2005/0035742 A1 | 2/2005 | Koo et al. | |
| 2005/0046388 A1 | 3/2005 | Tate, Jr. et al. | |
| 2005/0100786 A1 | 5/2005 | Ryu et al. | |
| 2005/0127874 A1 | 6/2005 | Lim et al. | |
| 2005/0134038 A1 | 6/2005 | Walsh | |
| 2005/0194936 A1 | 9/2005 | Cho | |
| 2006/0097698 A1 | 5/2006 | Plett | |
| 2006/0100833 A1 | 5/2006 | Plett | |
| 2006/0111854 A1 | 5/2006 | Plett | |
| 2006/0111870 A1 | 5/2006 | Plett | |
| 2007/0035307 A1 | 2/2007 | Scoch | |
| 2007/0046292 A1 | 3/2007 | Plett | |
| 2007/0103120 A1 | 5/2007 | Plett | |
| 2007/0120533 A1 | 5/2007 | Plett | |
| 2007/0188143 A1 | 8/2007 | Plett | |
| 2007/0236182 A1 | 10/2007 | Plett | |
| 2008/0003491 A1 * | 1/2008 | Yahnker et al. | 429/62 |
| 2008/0090137 A1 | 4/2008 | Buck et al. | |
| 2008/0094035 A1 | 4/2008 | Plett | |
| 2009/0029239 A1 | 1/2009 | Koetting et al. | |
| 2009/0186265 A1 | 7/2009 | Koetting et al. | |
| 2009/0325051 A1 | 12/2009 | Niedzwiecki et al. | |
| 2009/0325052 A1 | 12/2009 | Koetting et al. | |
| 2009/0325053 A1 | 12/2009 | Koetting et al. | |
| 2009/0325054 A1 | 12/2009 | Payne et al. | |
| 2009/0325055 A1 | 12/2009 | Koetting et al. | |
| 2009/0325059 A1 | 12/2009 | Niedzwiecki et al. | |
| 2010/0055553 A1 * | 3/2010 | Kimura | 429/120 |
| 2010/0086842 A1 | 4/2010 | Yang | |
| 2010/0104935 A1 * | 4/2010 | Hermann et al. | |
| 2010/0266883 A1 | 10/2010 | Koetting et al. | |
| 2010/0275619 A1 | 11/2010 | Koetting et al. | |
| 2010/0276132 A1 | 11/2010 | Payne | |
| 2010/0279152 A1 | 11/2010 | Payne | |
| 2010/0279154 A1 | 11/2010 | Koetting et al. | |
| 2011/0027625 A1 | 2/2011 | Payne | |
| 2011/0027640 A1 | 2/2011 | Gadawski et al. | |
| 2011/0052959 A1 | 3/2011 | Koetting et al. | |

FOREIGN PATENT DOCUMENTS

| | | |
|---|---|---|
| EP | 0673553 B1 | 2/2001 |
| EP | 1091432 A2 | 4/2001 |
| EP | 1435675 A1 | 7/2004 |
| JP | 58084882 A | 5/1983 |
| JP | 4056079 A | 2/1992 |
| JP | 8138735 A | 5/1996 |
| JP | 8222280 A | 8/1996 |
| JP | 9129213 A | 5/1997 |
| JP | 09219213 | 8/1997 |
| JP | 10199510 A | 7/1998 |
| JP | 10223263 A | 8/1998 |
| JP | 11066949 A | 3/1999 |
| JP | 11191432 A | 7/1999 |
| JP | 11307139 A | 11/1999 |
| JP | 2001060466 A | 3/2001 |
| JP | 2002038033 A | 2/2002 |
| JP | 2003188323 A | 7/2003 |
| JP | 2003219572 A | 7/2003 |
| JP | 2003257505 A | 9/2003 |
| JP | 2005126315 | 5/2005 |

(56) References Cited

FOREIGN PATENT DOCUMENTS

| | | |
|---|---|---|
| JP | 2005349955 A | 12/2005 |
| JP | 2008080995 | 4/2008 |
| JP | 2009009853 A | 1/2009 |
| JP | 2009009889 A | 1/2009 |
| JP | 2009037934 A * | 2/2009 |
| JP | 2009054297 A | 3/2009 |
| JP | 2010062130 A | 3/2010 |
| KR | 100256750 B1 | 5/2000 |
| KR | 100503853 B1 | 7/2005 |
| KR | 1020050092605 A | 9/2005 |
| KR | 1020070050468 A | 5/2007 |
| KR | 100765659 B1 | 10/2007 |
| KR | 100889241 B1 | 4/2008 |
| KR | 20080047641 A | 5/2008 |
| KR | 100921346 B1 | 10/2009 |
| WO | WO94/02969 A1 | 2/1994 |
| WO | WO03/071616 A2 | 8/2003 |
| WO | WO2004/023595 A1 | 3/2004 |
| WO | WO 2008090939 A1 * | 7/2008 |

OTHER PUBLICATIONS

European Supplementary Search Report dated Aug. 28, 2009 for EP Application No. 04774658.
International Search Report for International application No. PCT/KR2005/003755 dated Mar. 2, 2006.
International Search Report for International application No. PCT/KR2009/000258 dated Aug. 28, 2009.
International Search Report for International application No. PCT/KR2009/003432 dated Jan. 18, 2010.
International Search report for International application No. PCT/KR2009/003434 dated Jan. 18, 2010.
International Search Report for International application No. PCT/KR2010/002336 dated Jan. 31, 2011.
International Search Report for International application No. PCT/KR2010/002338 dated Jan. 31, 2011.
International Search report for International application No. PCT/KR2010/002337 dated Jan. 31, 2011.
U.S. Appl. No. 12/794,949, filed Jun. 7, 2010 entitled Battery Module and Methods for Bonding a Cell Terminal of a Battery to an Interconnect Member.
U.S. Appl. No. 12/857,908, filed Aug. 17, 2010 entitled Battery Cell Assemblies.
U.S. Appl. No. 12/861,364, filed Aug. 23, 2010 entitled Connecting Assembly.
U.S. Appl. No. 12/861,375, filed Aug. 23, 2010 entitled attery System and Manifold Assembly Having a Manifold Member and a Connecting Fitting.
U.S. Appl. No. 12/861,381, filed Aug. 23, 2010 entitled End Cap.
U.S. Appl. No. 12/861,394, filed Aug. 23, 2010 entitled Battery System and Manifold Assembly With Two Manifold Members Removably Coupled Together.
U.S. Appl. No. 12/868,111, filed Aug. 25, 2010 entitled Battery Module and Methods for Bonding Cell Terminals of Battery Cells Together.
U.S. Appl. No. 13/073,000, filed Mar. 28, 2011 entitled Battery Disconnect Unit and Method of Assembling the Battery Disconnect Unit.
U.S. Appl. No. 13/076,774, filed Mar. 31, 2011 entitled Battery Pack Having Liquid Leak Detection System.
U.S. Appl. No. 12/165,100, filed Jun. 30, 2008 entitled Battery Cell Assembly Having Heat Exchanger with Serpentine Flow Path.
U.S. Appl. No. 12/164,780, filed Jun. 30, 2008 entitled Battery Module Having Battery Cell Assembly with Heat Exchanger.
U.S. Appl. No. 12/164,627, filed Jun. 30, 2008 entitled Liquid Cooled Battery Manifold Assembly with Flow Balancing Feature.
U.S. Appl. No. 12/246,073, filed Oct. 6, 2008 entitled Battery Cell Carrier That Engages Side Walls of Active Cell.
U.S. Appl. No. 12/164,445, filed Jun. 30, 2008 entitled Battery Module Having a Rubber Cooling Manifold.
U.S. Appl. No. 12/016,630, filed Jan. 18, 2008 entitled Battery Cell Assembly and Method for Assembling the Battery Cell Assembly.
U.S. Appl. No. 12/258,696, filed Oct. 27, 2008 entitled Battery Module Having Cooling Manifold with Ported Screws and Method for Cooling the Battery Module.
U.S. Appl. No. 12/433,155, filed Apr. 30, 2009 entitled Cooling System for a Battery and a Method for Cooling the Battery System.
U.S. Appl. No. 12/433,427, filed Apr. 30, 2009 entitled Cooling Manifold and Method for Manufacturing the Cooling Manifold.
U.S. Appl. No. 12/433,534, filed Apr. 30, 2009 entitled Battery Systems, Battery Modules, and Method for Cooling a Battery Module.
U.S. Appl. No. 12/433,397, filed Apr. 30, 2009 entitled Battery Systems, Battery Modules, and Method for Cooling a Battery Module.
U.S. Appl. No. 12/164,741, filed Jun. 30, 2008 entitled Battery Module Having Battery Cell Assemblies with Alignment-Coupling Features.
U.S. Appl. No. 12/426,795, filed Apr. 20, 2009 entitled Frame Member, Frame Assembly and Battery Cell Assembly Made Therefrom and Methods of Making the Same.

* cited by examiner

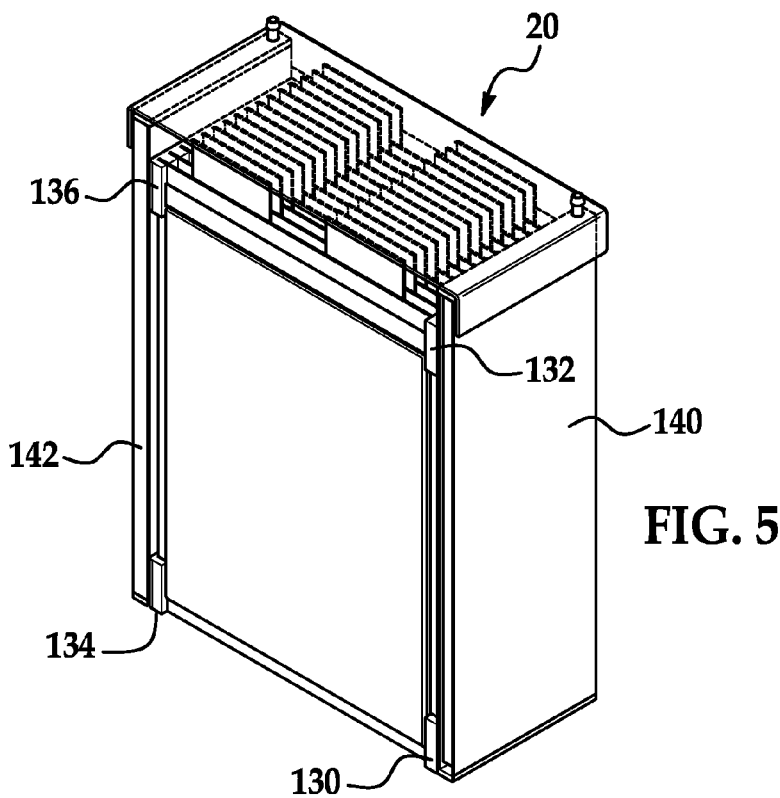
FIG. 5
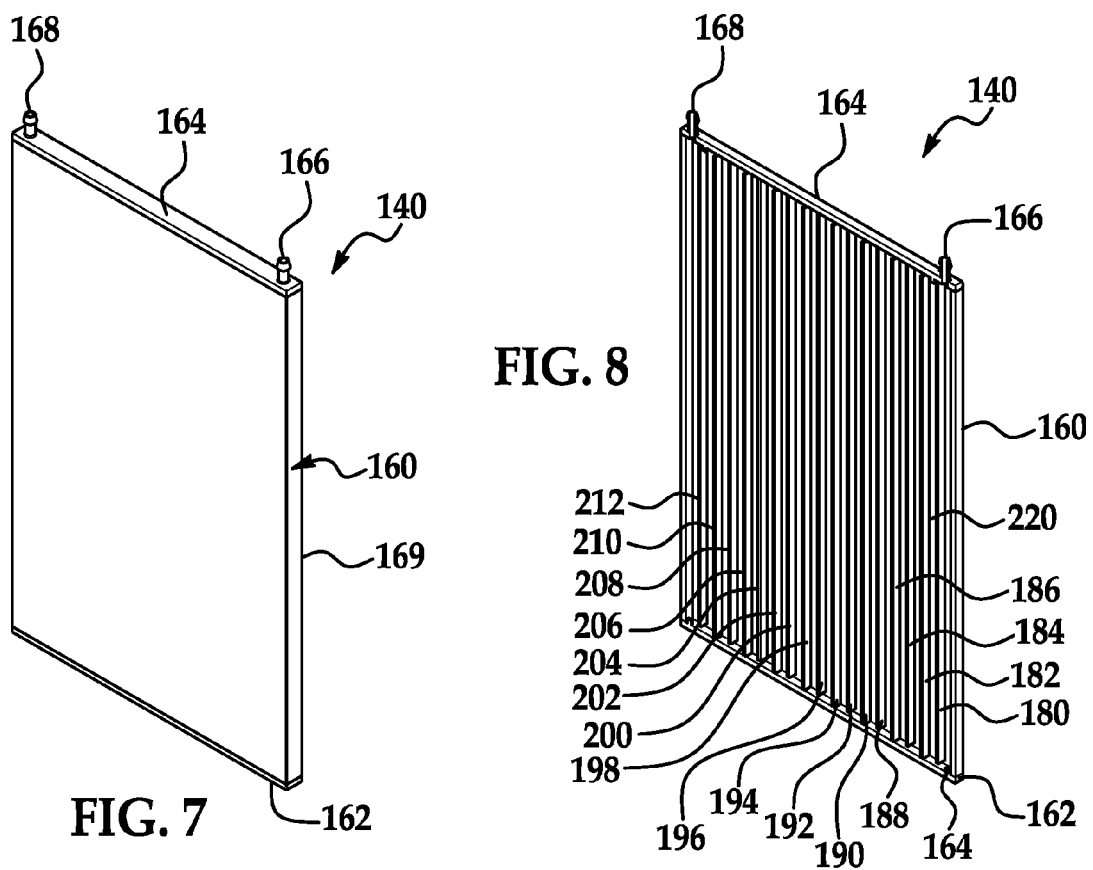
FIG. 7
FIG. 8

BATTERY SYSTEMS, BATTERY MODULE, AND METHOD FOR COOLING THE BATTERY MODULE

TECHNICAL FIELD

This application relates to battery systems, a battery module, and a method for cooling the battery module.

BACKGROUND OF THE INVENTION

In a typical air-cooled battery pack, ambient air from ambient atmosphere is directed across battery cells in the battery pack and is subsequently exhausted from the battery pack. However, the typical air-cooled battery pack has a major challenge in maintaining a temperature of the battery pack within a desired temperature range.

In particular, a maximum operating temperature of the battery cells can often be less than a temperature of ambient air utilized to cool the batteries. In this situation, it is impossible to maintain the battery cells within a desired temperature range in an air-cooled battery pack.

Accordingly, the inventors herein have recognized a need for an improved battery system having a battery module and method for cooling the battery module that minimizes and/or eliminates the above-mentioned deficiency.

SUMMARY OF THE INVENTION

A battery module in accordance with an exemplary embodiment is provided. The battery module includes a housing having a non-conductive oil disposed therein. The battery module further includes a battery cell disposed in the housing. The battery module further includes a cooling manifold disposed in the housing that contacts the non-conductive oil. The cooling manifold is configured to receive a fluid therethrough and to conduct heat energy from the non-conductive oil into the fluid to cool the battery cell.

A battery system in accordance with another exemplary embodiment is provided. The battery system includes a battery module having a housing, a battery cell, and a cooling manifold. The housing has a non-conductive oil disposed therein that contacts the cooling manifold. The battery cell and the cooling manifold are disposed in the housing. The cooling manifold is configured to receive a refrigerant therethrough and to conduct heat energy from the non-conductive oil into the refrigerant to cool the battery module. The battery system further includes a condenser fluidly coupled to the battery module. The condenser is configured to receive the refrigerant from the battery module and to extract heat energy from the refrigerant. The battery system further includes a compressor fluidly coupled to the condenser and configured to receive the refrigerant from the condenser. The compressor is further fluidly coupled to the battery module. The compressor is configured to pump the refrigerant from the condenser into the battery module.

A battery system in accordance with another exemplary embodiment is provided. The battery system includes a battery module having a housing, a battery cell, and a cooling manifold. The housing has a non-conductive oil disposed therein that contacts the cooling manifold. The battery cell and the cooling manifold are disposed in the housing. The cooling manifold is configured to receive a coolant therethrough and to conduct heat energy from the non-conductive oil into the coolant to cool the battery module. The battery system further includes a heat exchanger fluidly coupled to the battery module. The heat exchanger is configured to receive the coolant from the battery module therein and to extract heat energy from the coolant flowing therethrough. The battery system further includes a cold plate fluidly coupled to the heat exchanger. The cold plate is configured to extract heat energy from the coolant flowing therethrough. The battery system further includes a reservoir fluidly coupled between the cold plate and a pump. The reservoir is configured to receive the coolant from the cold plate and to route the coolant to the pump. The pump is further fluidly coupled to the battery module. The pump is configured to pump the coolant from the reservoir into the battery module.

A method for cooling a battery module in accordance with another exemplary embodiment is provided. The battery module has a housing, a battery cell, and a cooling manifold. The method includes conducting heat energy from the battery cell into a non-conductive oil disposed in the housing. The method further includes receiving fluid in the cooling manifold and conducting heat energy from the non-conductive oil into the fluid to cool the battery cell in the housing.

BRIEF DESCRIPTION OF THE DRAWINGS

FIG. 5 is a cross-sectional schematic of the battery module of FIG. 3;

FIG. 7 is a schematic of a cooling manifold utilized in the battery module of FIG. 3;

FIG. 8 is a cross-sectional schematic of the cooling manifold of FIG. 7;

DETAILED DESCRIPTION OF EXEMPLARY EMBODIMENTS

Figure 1:
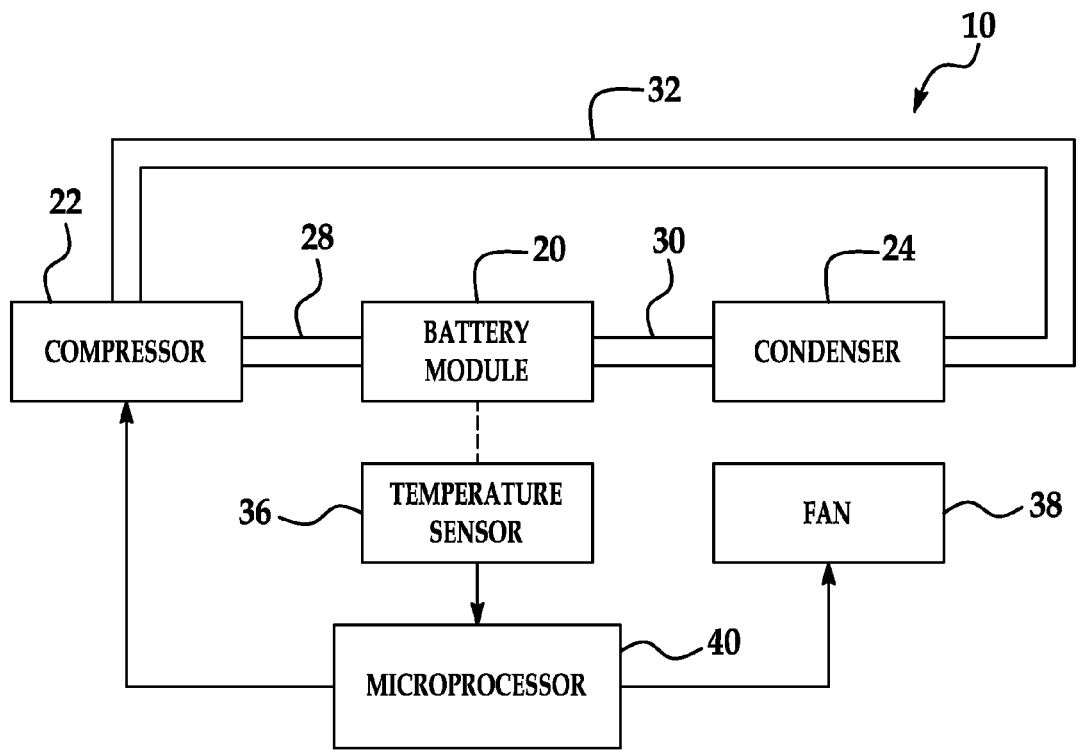
FIG. 1 is a schematic of a battery system in accordance with an exemplary embodiment.

Referring to FIG. 1, a battery system 10 for generating electrical power in accordance with an exemplary embodiment is illustrated. The battery system 10 includes a battery module 20, a compressor 22, a condenser 24, conduits 28, 30, 32, a temperature sensor 36, a fan 38, and a microprocessor 40. An advantage of the battery module 20 is that the battery module utilizes a non-conductive oil to transfer heat energy from a battery cell to at least one cooling manifold to effectively cool the battery cell.

For purposes of understanding, the term "fluid" means either a liquid or a gas. For example, a fluid can comprise either a coolant or a refrigerant. Exemplary coolants include ethylene glycol and propylene glycol. Exemplary refrigerants include R-11, R-12, R-22, R-134A, R-407C and R-410A.

Referring to FIGS. 2, 3, 5 and 6, the battery module 20 is provided to generate a voltage therein. The battery module 20 includes a housing 60, battery cells 66, 68, 70, 72, 74, 76, 78, 80, 82, 84, 86, 88, 90, 92, 94, 96, 98, 100, 102, 104, 106, 108, 110, 112, 114, cell holders 130, 132, 134, 136, cooling manifolds 140, 142, and a non-conductive fluid 150.

Figure 2:
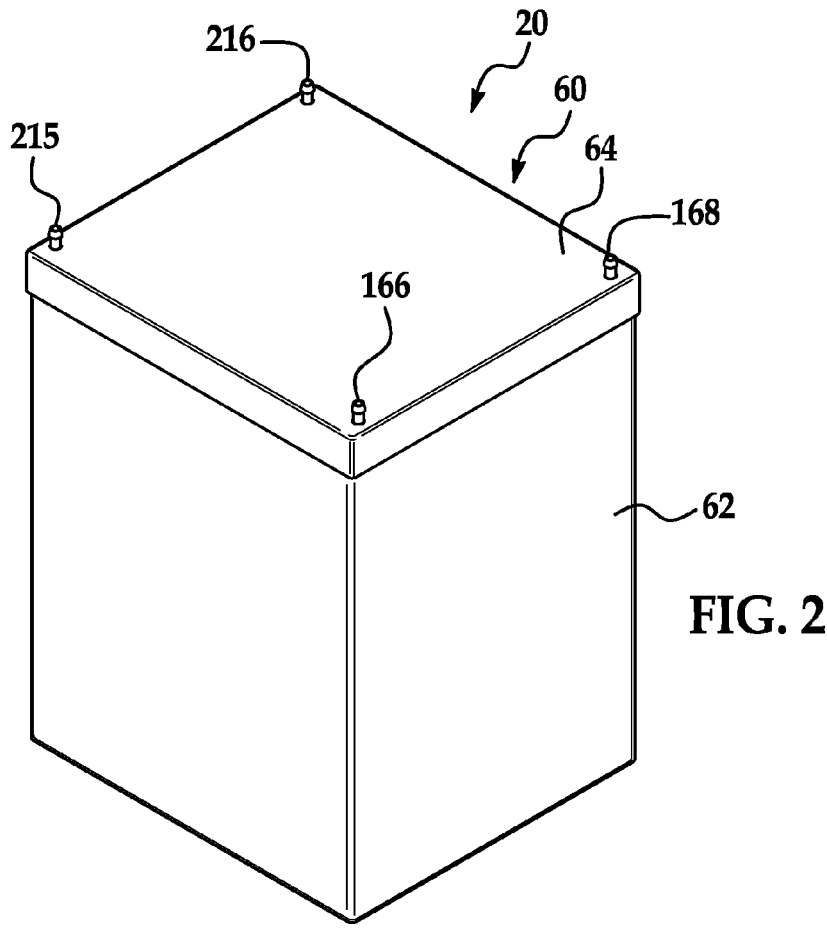
FIG. 2 is a schematic of a battery module utilized in the battery system of FIG. 1 in accordance with another exemplary embodiment.
Figure 3:
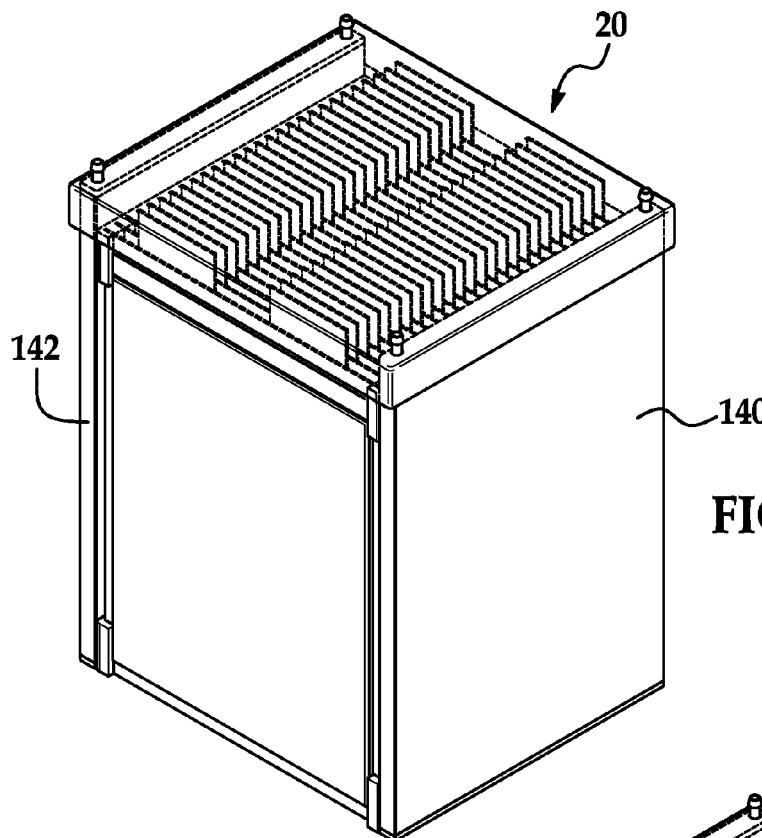
FIG. 3 is another schematic of the battery module of FIG. 2.
Figure 4:
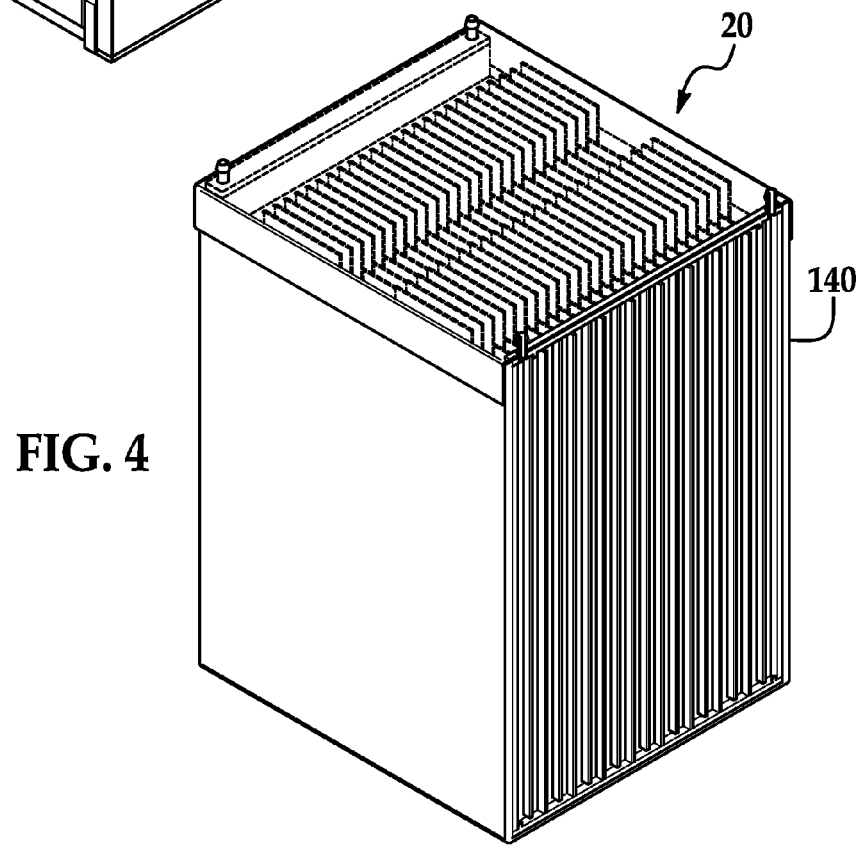
FIG. 4 is another schematic of the battery module of FIG. 2.

Referring to FIG. 2, the housing 60 includes a lower housing portion 62 and a lid 64 that is fixedly coupled to the lower housing portion 62. In one exemplary embodiment, the lid 64 is sealed to the lower housing portion 62 such that the non-conductive fluid 150 is maintained within the lower housing portion 62 without leaking therefrom. In one exemplary embodiment, the lid 64 and the lower housing portion 62 are constructed from plastic.

Figure 6:
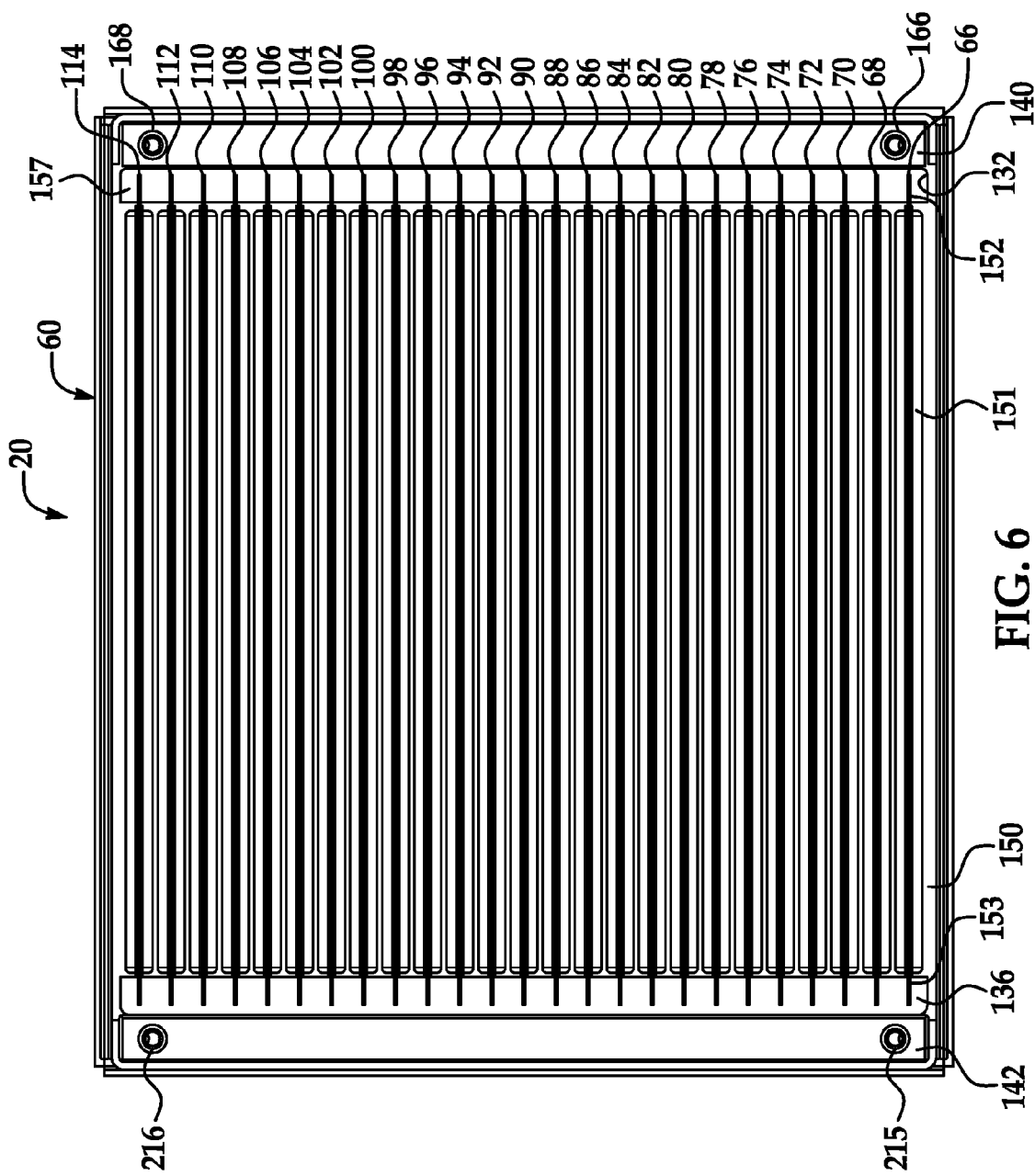
FIG. 6 is an enlarged schematic of a top portion of the battery module of FIG. 3.

Referring to FIGS. 5 and 6, the battery cells 66, 68, 70, 72, 74, 76, 78, 80, 82, 84, 86, 88, 90, 92, 94, 96, 98, 100, 102, 104, 106, 108, 110, 112, 114 are provided to generate an electrical voltage. In particular, each of the battery cells has a substantially similar structure. For example, referring to battery cell 66, the battery cell includes a body portion 151, flange portions 152, 153, and a pair of electrodes extending upwardly from the body portion 151. The flange portions 152, 153 extend from first and second ends of the body portion 151. Each pair of electrodes extending from each battery cell has a voltage therebetween. The electrodes of the battery cells can be electrically coupled together either in series or in parallel depending upon a desired voltage and current of the battery module 20. The battery cells are stacked proximate to one another within the lower housing portion 62. Further, each of the battery cells are coupled at a first end to the cell holders 130, 132, and are further coupled at a second end to the cell holders 134, 136. In one exemplary embodiment, each battery cell is a lithium-ion battery cell. In alternative embodiments, the battery cells could be nickel-cadmium battery cells or nickel metal hydride battery cells for example. Of course, other types of battery cells known to those skilled in the art could be utilized.

The cell holders 130, 132, 134, 136 are provided to fixedly hold the battery cells within the housing 60. Each of the cell holders has an identical structure and may be constructed of plastic. The cell holder 132 includes a plate portion 157 having a plurality of slots or grooves extending therein for receiving corresponding flange portions from the battery cells. For example, the flange portion 152 of the battery cell 66 is received within corresponding slots in the cell holders 130, 132 to maintain a position of the battery cell 66 within the lower housing portion 62. Further, the flange portion 153 of the battery cell 66 is received within corresponding slots in the cell holders 134, 136 to maintain a position of the battery cell 66 within the lower housing portion 62. The other battery cells are coupled to the cell holders in a similar manner as the battery cell 66.

Referring to FIGS. 4 and 6-8, the cooling manifold 140 is disposed in the housing 60 adjacent to the cell holders 130, 132. In one exemplary embodiment, the cooling manifold 140 is configured to receive a refrigerant therethrough that extracts heat energy from the non-conductive oil 150 in the housing 60 to cool the battery cells in the housing 60. Of course in an alternative embodiment, the cooling manifold 140 could receive a fluid to extract heat energy from the non-conductive oil 150. The cooling manifold 140 can maintain the battery cells within a desired temperature range, and in particular can maintain the battery cells at a temperature less than a threshold temperature level. In one exemplary embodiment, the desired temperature range is 15° Celsius-35° Celsius. In another exemplary embodiment, the threshold temperature level is 40° Celsius.

The cooling manifold 140 includes an extruded housing portion 160, a bottom cap 162, a top cap 164, and ports 166, 168. The extruded housing portion 160, the bottom cap 162, the top cap 164, and the ports 166, 168 can be constructed from at least one of aluminum, copper, silver, gold, and alloys thereof. The extruded housing portion 160 defines an interior region for receiving refrigerant therein. The housing portion 160 includes an outer wall 169 and inner walls 180, 182, 184, 186, 188, 190, 192, 194, 196, 198, 200, 202, 204, 206, 208, 210, 212 that are attached to the outer wall 169. The inner walls are disposed substantially parallel to one another and define a serpentine flow path through the cooling manifold 140. The bottom cap 162 is fixedly coupled to a bottom surface of the extruded housing portion 160. Further, the top cap 164 is fixedly coupled to a top surface of the extruded housing portion 160. The ports 166, 168 are disposed on the top cap 164 over first and second apertures, respectively, extending through the top cap 164. During operation, refrigerant flows through the port 166 and into the interior region of the housing portion 160 and then through the serpentine flow path defined by the inner walls and then through the port 168. The refrigerant extracts heat energy from the housing 60 to cool the non-conductive oil 150 that further cools the battery cells in the housing 60.

The cooling manifold 142 is disposed in the housing 60 adjacent to the cell holders 134, 136. The cooling manifold 142 has an identical structure as the cooling manifold 140 and includes ports 215, 216. In one exemplary embodiment, the cooling manifold 142 is configured to receive a refrigerant therethrough that extracts heat energy from the non-conductive oil 150 in the housing 60 to cool the battery cells in the housing 60. Further, the cooling manifold 142 can maintain the battery cells within a desired temperature range, and in particular can maintain the battery cells at a temperature less than a threshold temperature level.

Referring to FIG. 6, the non-conductive oil 150 is disposed in the housing 60 and contacts the battery cells to absorb heat energy from the battery cells. In one exemplary embodiment, the non-conductive oil is mineral oil. Of course, other types of non-conductive fluids known to those skilled in the art could be utilized instead of the non-conductive oil.

Referring again to FIG. 1, the compressor 22 is configured to pump a refrigerant through the conduit 28 into the battery module 20 in response to a control signal from the microprocessor 40. As shown, the conduit 28 is fluidly coupled to the compressor 22 and ports 116, 215 of the cooling manifolds in the battery module 20. The conduit 30 is fluidly coupled to the ports 168, 216 of the cooling manifolds in the battery module 20 and the condenser 24. After exiting the battery module 20, the refrigerant is pumped through the conduit 30 to the condenser 24.

The condenser 24 is provided to extract heat energy from the refrigerant flowing therethrough to cool the refrigerant. As shown, a conduit 32 is fluidly coupled between the condenser 24 and the compressor 22. After exiting the condenser 24, the refrigerant is pumped through the conduit 32 to the compressor 22.

The temperature sensor 36 is provided to generate a signal indicative of a temperature level of the non-conductive oil 150 disposed in the housing 60 that is received by the microprocessor 40. The signal from the temperature sensor 36 is further indicative of a temperature level of the battery cells.

The fan 38 is provided to urge air past the condenser 24 to cool the condenser 24 in response to a control signal from the microprocessor 40. As shown, the fan 38 is disposed proximate to the condenser 24.

The microprocessor 40 is provided to control operation of the battery system 10. In particular, the microprocessor 40 is configured to generate control signals for controlling operation of the compressor 22 and the fan 38, in response to a signal from the temperature sensor 36, as will be explained in greater detail below.

Figure 9:
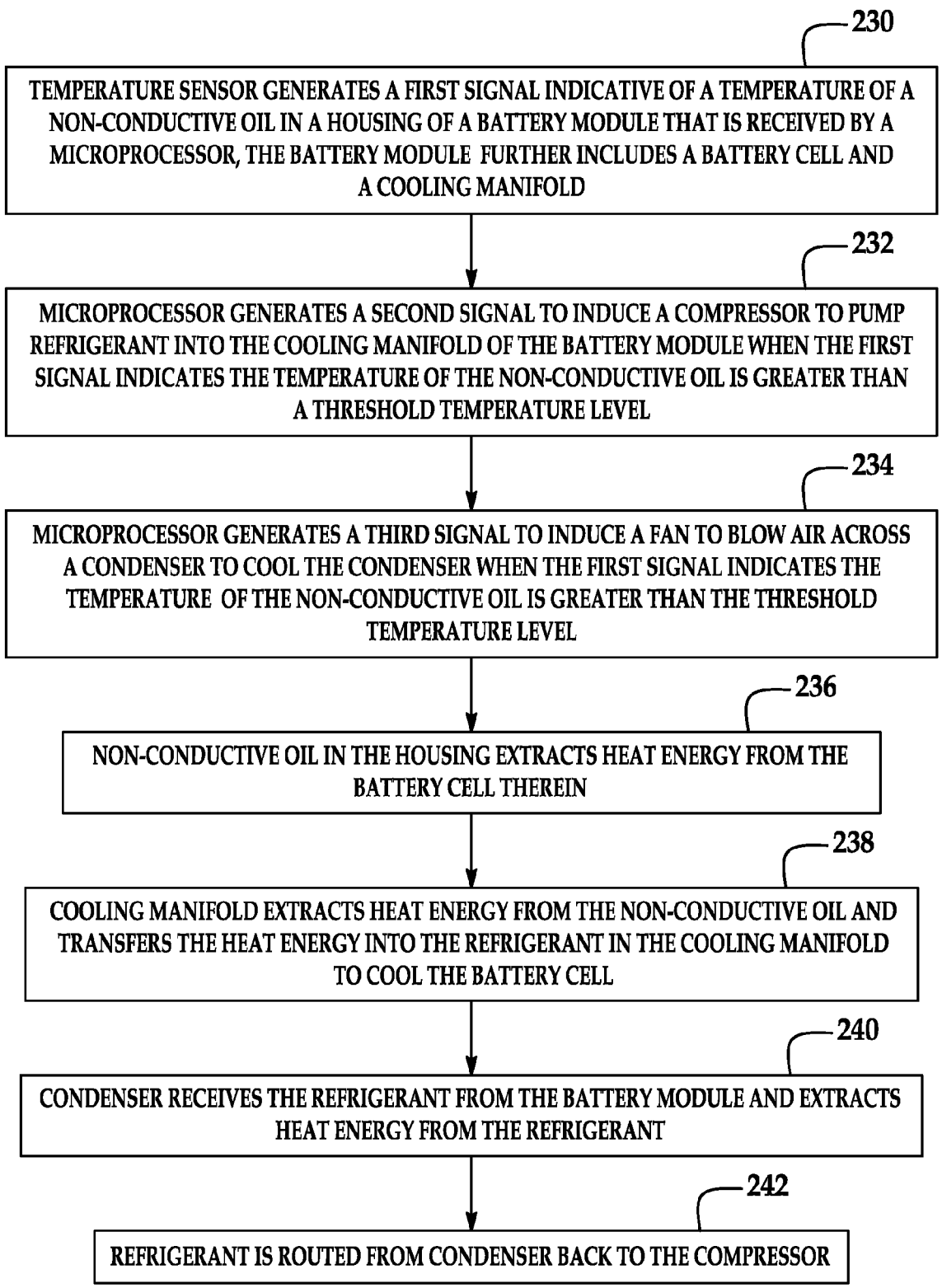
FIG. 9 is a flowchart of a method for cooling a battery module in the battery system of FIG. 1 in accordance with another exemplary embodiment.

Referring to FIG. 9, a flowchart of a method for cooling the battery module 20 in accordance with another exemplary embodiment is provided. For purposes of simplicity, the flowchart will be explained utilizing one battery cell and one cooling manifold in the battery module 20.

At step 230, the temperature sensor 36 generates a first signal indicative of a temperature of a non-conductive oil 150 in the housing 60 of the battery module 20 that is received by the microprocessor 40. The battery module 20 further includes a battery cell and the cooling manifold 140.

At step 232, the microprocessor 40 generates a second signal to induce the compressor 22 to pump refrigerant into the cooling manifold 140 of the battery module 20 when the first signal indicates the temperature of the non-conductive oil is greater than a threshold temperature level.

At step 234, the microprocessor 40 generates a third signal to induce the fan 38 to blow air across the condenser 24 to cool the condenser 24 when the first signal indicates the temperature of the non-conductive oil is greater than the threshold temperature level.

At step 236, the non-conductive oil in the housing 60 extracts heat energy from the battery cell therein.

At step 238, the cooling manifold 140 extracts heat energy from the non-conductive oil 150 and transfers the heat energy into the refrigerant in the cooling manifold 140 to cool the battery cell 20.

At step 240, the condenser 24 receives the refrigerant from the battery module 20 and extracts heat energy from the refrigerant.

At step 242, the refrigerant is routed from the condenser 24 back to the compressor 22.

Figure 10:
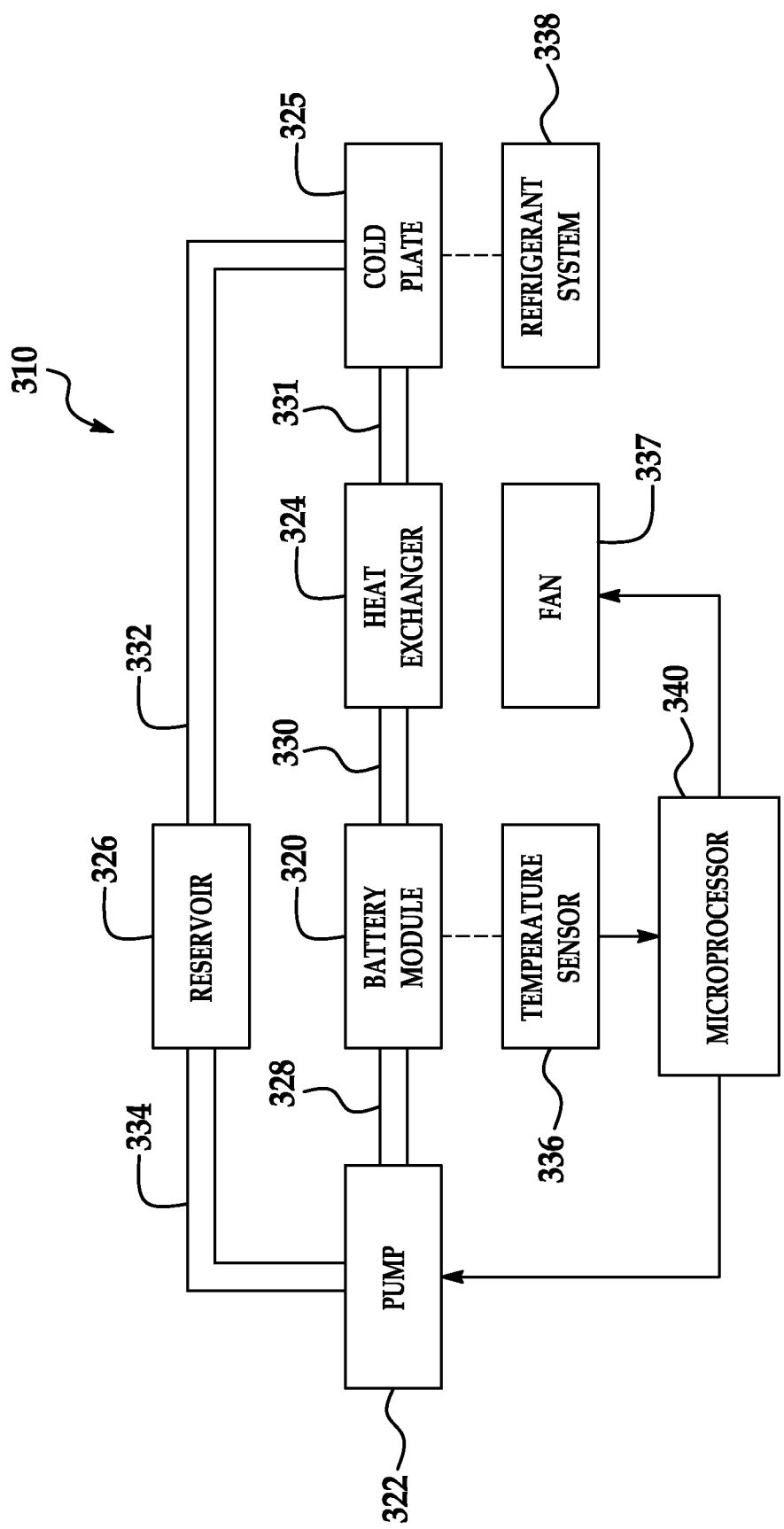
FIG. 10 is a schematic of another battery system in accordance with another exemplary embodiment.

Referring to FIG. 10, a battery system 310 for generating electrical power in accordance with another exemplary embodiment is illustrated. The battery system 310 includes a battery module 320, a pump 322, a heat exchanger 324, a cold plate 325, a reservoir 326, conduits 328, 330, 331, 332, 334, a temperature sensor 336, a fan 337, a refrigerant system 338, and a microprocessor 340. The primary difference between the battery system 310 and the battery system 10 is that the battery system 310 utilizes a coolant instead of a refrigerant to cool the battery module 320.

The battery module 320 has an identical structure as the battery module 20 discussed above.

The pump 322 is configured to pump a coolant through the conduit 328 into the battery module 320 in response to a control signal from the microprocessor 340. As shown, the conduit 328 is fluidly coupled between the pump 322 and the battery module 320, and the conduit 330 is fluidly coupled between the battery module 320 and the heat exchanger 324. After exiting the battery module 320, the coolant is pumped through the conduit 330 to the heat exchanger 324.

The heat exchanger 324 is provided to extract heat energy from the coolant flowing therethrough to cool the coolant. As shown, a conduit 331 is fluidly coupled between the heat exchanger 324 and the cold plate 325. After exiting the heat exchanger 324, the coolant is pumped through the conduit 331 to the cold plate 325.

The fan 337 is provided to urge air past the heat exchanger 324 to cool the heat exchanger 324 in response to a control signal from the microprocessor 340. As shown, the fan 337 is disposed proximate to the heat exchanger 324.

The cold plate 325 is provided to extract heat energy from the coolant flowing therethrough to further cool the coolant. As shown, a conduit 322 is fluidly coupled between the cold plate 325 and the reservoir 326. After exiting the cold plate 325, the coolant is pumped through the conduit 332 to the reservoir 326.

The reservoir 326 is provided to store at least a portion of the coolant therein. As shown, a conduit 334 is fluidly coupled between the reservoir 326 and the pump 322. After exiting the reservoir 326, the coolant is pumped through the conduit 334 to the pump 322.

The temperature sensor 336 is provided to generate a signal indicative of a temperature level of the battery module 320 that is received by the microprocessor 340.

The refrigerant system 338 is provided to cool the heat exchanger 324 in response to a control signal from the microprocessor 340. As shown, the refrigerant system 338 is operably coupled to the cold plate 325.

The microprocessor 340 is provided to control operation of the battery system 310. In particular, the microprocessor 340 is configured to generate control signals for controlling operation of the pump 322, the fan 337, and the refrigerant system 338 in response to a signal from the temperature sensor 336, as will be explained in greater detail below.

Figure 11:
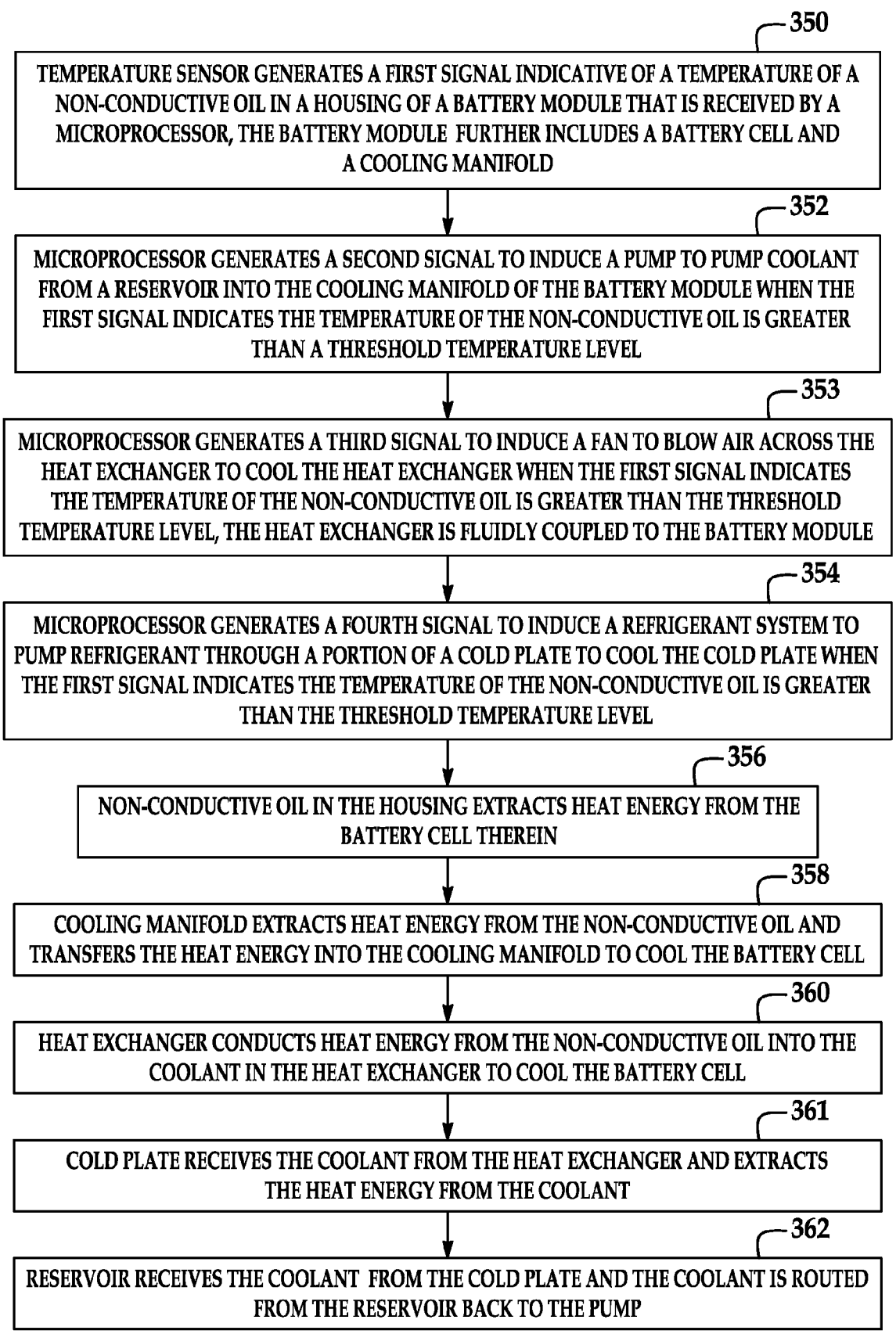
FIG. 11 is a flowchart of a method for cooling a battery module in the battery system of FIG. 10 in accordance with another exemplary embodiment.

Referring to FIG. 11, a flowchart of a method for cooling the battery module 320 in accordance with another exemplary embodiment is provided. For purposes of simplicity, the flowchart will be explained utilizing one battery cell and one cooling manifold in the battery module 320. Of course, additional battery cells and cooling manifolds could be utilized.

At step 350, the temperature sensor 336 generates a first signal indicative of a temperature of a non-conductive oil in a housing of the battery module 320 that is received by the microprocessor 340. The battery module 320 further includes a battery cell and a cooling manifold.

At step 352, the microprocessor 340 generates a second signal to induce the pump 322 to pump coolant from the reservoir 326 into the cooling manifold of the battery module 320 when the first signal indicates the temperature of the non-conductive oil is greater than a threshold temperature level.

At step 353, the microprocessor 340 generates a third signal to induce the fan 337 to blow air across the heat exchanger 324 to cool the heat exchanger 324 when the first signal indicates that the temperature of the non-conductive oil is greater than the threshold temperature level. The heat exchanger 324 is fluidly coupled to the battery module 320.

At step 354, the microprocessor 340 generates a third signal to induce the refrigerant system 338 to pump refrigerant through a portion of the cold plate 325 to cool the cold plate 325 when the first signal indicates the temperature of the non-conductive oil is greater than the threshold temperature level.

At step 356, the non-conductive oil in the housing extracts heat energy from the battery cell therein.

At step 358, the cooling manifold extracts heat energy from the non-conductive oil and transfers the heat energy into the coolant in the cooling manifold to cool the battery cell.

At step 360, the heat exchanger 324 conducts heat energy from the non-conductive oil into the coolant in the heat exchanger 324 to cool the battery cell.

At step 361, the cold plate 325 receives the coolant from the heat exchanger 324 and extracts the heat energy from the coolant.

At step 362, the reservoir 326 receives the coolant from the cold plate 325 and the coolant is routed from the reservoir 326 back to the pump 322.

The battery systems, the battery module, and the method for cooling the battery module provide a substantial advantage over other systems, modules, and methods. In particular, the battery systems, the battery module, and the method provide a technical effect of cooling a battery cell in the battery module utilizing a non-conductive oil that contacts the battery cell in conjunction with a cooling manifold that cools the non-conductive oil.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying this invention, but that the invention will include all embodiments falling within the scope of the appended claims. Moreover, the use of the terms, first, second, etc. are used to distinguish one element from another. Further, the use of the terms a, an, etc. do not denote a limitation of quantity, but rather denote the presence of at least one of the referenced items.

What is claimed is:

1. A battery module, comprising:
   a housing having a non-conductive oil disposed therein;
   a battery cell having a body portion and first and second flange portions extending from first and second ends, respectively of the body portion, the battery cell being disposed in the housing and the non-conductive oil being configured to contact the battery cell to absorb heat energy from the battery cell;
   first and second plastic cell holders being disposed in the housing, the first plastic cell holder having a slot configured to receive the first flange portion of the battery cell therein, the second plastic cell holder having a slot configured to receive the second flange portion of the battery cell therein; and
   a cooling manifold having a housing portion with an outer wall and a plurality of inner walls, the plurality of inner walls being attached to the outer wall and defining a flow path within the housing portion, the housing portion of the cooling manifold being disposed entirely in the housing and contacting the non-conductive oil, the cooling manifold configured to receive a fluid that flows through the flow path while conducting heat energy from the non-conductive oil into the fluid to cool the battery cell,
   the battery cell being disposed outside of the housing portion of the cooling manifold.

2. The battery module of claim 1, wherein the non-conductive oil comprises mineral oil.

3. The battery module of claim 1, wherein the fluid comprises a coolant.

4. The battery module of claim 3, wherein the coolant comprises at least one of ethylene glycol and propylene glycol.

5. The battery module of claim 1, wherein the fluid comprises a refrigerant.

6. The battery module of claim 1, wherein the cooling manifold defines an interior region and has an inlet port and an outlet port.

7. The battery module of claim 6, wherein the cooling manifold is constructed from at least one of aluminum, copper, silver, and gold.

8. The battery module of claim 1, wherein the housing is constructed from plastic.

9. A battery system, comprising:
   a battery module having a housing, a battery cell, first and second plastic cell holders, and a cooling manifold, the housing having a non-conductive oil disposed therein;
   the battery cell having a body portion and first and second flange portions extending from first and second ends, respectively of the body portion, the battery cell being disposed in the housing and the non-conductive oil being configured to contact the battery cell to absorb heat energy from the battery cell;
   the first and second plastic cell holders being disposed in the housing, the first plastic cell holder having a slot configured to receive the first flange portion of the battery cell therein, the second plastic cell holder having a slot configured to receive the second flange portion of the battery cell therein;
   the cooling manifold having a housing portion with an outer wall and a plurality of inner walls, the plurality of inner walls being attached to the outer wall and defining a flow path, the housing portion of the cooling manifold being disposed entirely in the housing and contacting the non-conductive oil, the cooling manifold configured to receive a refrigerant that flows through the flow path while conducting heat energy from the non-conductive oil into the refrigerant to cool the battery module, the battery cell being disposed outside of the housing portion of the cooling manifold;
   a condenser fluidly coupled to the battery module, the condenser configured to receive the refrigerant from the battery module and to extract heat energy from the refrigerant;
   a compressor fluidly coupled to the condenser and configured to receive the refrigerant from the condenser, the compressor further fluidly coupled to the battery module, the compressor configured to pump the refrigerant from the condenser into the battery module;
   a temperature sensor configured to generate a first signal indicative of a temperature of the non-conductive oil; and
   a microprocessor operably coupled to the temperature sensor, the microprocessor configured to generate a second signal to induce the compressor to pump the refrigerant into the cooling manifold when the first signal indicates the temperature of the non-conductive oil is greater than a threshold temperature level.

10. The battery system of claim 9, wherein the non-conductive oil comprises mineral oil.

11. The battery system of claim 9, wherein the cooling manifold defines an interior region and has an inlet port and an outlet port.

12. The battery system of claim 11, wherein the cooling manifold is constructed from at least one of aluminum, copper, silver, and gold.

13. The battery system of claim 9, wherein the housing of the battery module is constructed from plastic.

14. A battery system, comprising:
   a battery module having a housing, a battery cell, first and second plastic cell holders, and a cooling manifold, the housing having a non-conductive oil disposed therein;
   the battery cell having a body portion and first and second flange portions extending from first and second ends, respectively of the body portion, the battery cell being disposed in the housing and the non-conductive oil being configured to contact the battery cell to absorb heat energy from the battery cell;
   the first and second plastic cell holders being disposed in the housing, the first plastic cell holder having a slot configured to receive the first flange portion of the battery cell therein, the second plastic cell holder having a slot configured to receive the second flange portion of the battery cell therein;

the cooling manifold having a housing portion with an outer wall and a plurality of inner walls, the plurality of inner walls being attached to the outer wall and defining a flow path, the housing portion of the cooling manifold being disposed entirely in the housing and contacting the non-conductive oil, the cooling manifold configured to receive a coolant that flows through the flow path while conducting heat energy from the non-conductive oil into the coolant to cool the battery module, wherein the battery cell is disposed outside of the housing portion of the cooling manifold;

a heat exchanger fluidly coupled to the battery module, the heat exchanger configured to receive the coolant from the battery module therein and to extract heat energy from the coolant flowing therethrough;

a cold plate fluidly coupled to the heat exchanger, the cold plate configured to extract heat energy from the coolant flowing therethrough;

a reservoir fluidly coupled between the cold plate and a pump, the reservoir configured to receive the coolant from the cold plate and to route the coolant to the pump; and the pump further fluidly coupled to the battery module, the pump configured to pump the coolant from the reservoir into the battery module.

15. The battery module of claim 1, wherein the first plastic cell holder is disposed between the battery cell and the cooling manifold within the housing.

16. The battery system of claim 9, wherein the first plastic cell holder is disposed between the battery cell and the cooling manifold within the housing.

17. The battery system of claim 14, wherein the first plastic cell holder is disposed between the battery cell and the cooling manifold within the housing.

\* \* \* \* \*